US009821892B2

(12) United States Patent
Johnson et al.

(10) Patent No.: US 9,821,892 B2
(45) Date of Patent: Nov. 21, 2017

(54) WIND SENSOR MOTION COMPENSATION SYSTEMS AND METHODS

(71) Applicant: FLIR Systems, Inc., Wilsonville, OR (US)

(72) Inventors: Mark Johnson, Vannes (FR); Chris Hodgson, Vannes (FR)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 14/852,010

(22) Filed: Sep. 11, 2015

(65) Prior Publication Data

US 2015/0375837 A1  Dec. 31, 2015

Related U.S. Application Data (63) Continuation of application No. PCT/US2014/026725, filed on Mar. 13, 2014.
(Continued)

(51) Int. Cl.
 *B63B 39/00* (2006.01)
 *G01P 21/02* (2006.01)
(Continued)

(52) U.S. Cl.
 CPC .......... *B63B 39/00* (2013.01); *B63H 25/04* (2013.01); *G01F 1/00* (2013.01); *G01F 25/00* (2013.01);
(Continued)

(58) Field of Classification Search
 CPC  B63B 39/00; G01F 1/00; G01F 25/00; B63H 25/04; Y02E 10/723; Y02E 10/72;
(Continued)

(56) References Cited

U.S. PATENT DOCUMENTS 5,550,925 A * 8/1996 Hori .................. H03G 5/165
  381/98
6,666,410 B2 * 12/2003 Boelitz .................. B64G 1/002
  244/171.1
(Continued)

FOREIGN PATENT DOCUMENTS

WO  WO 2005/008284   1/2005
WO  WO 2009/134221  11/2009

OTHER PUBLICATIONS

Ground et al., "High-Resolution Doppler Lidar for Boundary Layer and Cloud Research", Journal of Atmospheric and Oceanic Technology, Mar. 2001, pp. 376-393, vol. 18, Issue 3, American Meteorological Society.

*Primary Examiner* — Mussa A Shaawat
*Assistant Examiner* — Sanjeev Malhotra
(74) *Attorney, Agent, or Firm* — Haynes and Boone, LLP (57) ABSTRACT

Techniques are disclosed for systems and methods to provide wind sensor motion compensation for wind sensors mounted to moving platforms. A wind sensor motion compensation system may include a wind sensor, a wind sensor accelerometer, one or more additional sensors, actuators, controllers, user interfaces, and/or other modules mounted to or in proximity to a vehicle. The wind sensor motion compensation system may be implemented with one or more logic devices adapted to receive sensor signals and determine a sensor-motion compensated wind velocity. The logic devices may be adapted to receive a wind sensor acceleration and a relative wind velocity from a wind sensor, determine a wind sensor velocity from the wind sensor acceleration, and determine a sensor-motion compensated relative wind velocity from the wind sensor velocity and the relative wind velocity.

24 Claims, 5 Drawing Sheets

Related U.S. Application Data (60) Provisional application No. 61/785,327, filed on Mar. 14, 2013.

(51) Int. Cl.
*B63H 25/04* (2006.01)
*G01F 1/00* (2006.01)
*G01F 25/00* (2006.01)

(52) U.S. Cl.
CPC ...... *G01P 21/025* (2013.01); *B63H 2025/045* (2013.01)

(58) Field of Classification Search
CPC ..... Y02E 10/722; F03D 17/00; F03D 7/0224; F03D 7/048; H01Q 1/34
USPC ............. 701/26, 415, 14; 702/62; 704/201; 455/42, 404.2; 73/170.17; 381/98; 416/1, 9; 415/1; 290/44; 182/19; 244/158.1, 171.1; 703/2
See application file for complete search history.

(56) References Cited

U.S. PATENT DOCUMENTS

| | | | |
|---|---|---|---|
| 8,219,267 B2* | 7/2012 | Hamke | G01P 5/00 701/14 |
| 2003/0150961 A1* | 8/2003 | Boelitz | B64G 1/002 244/158.1 |
| 2009/0157293 A1* | 6/2009 | Cornett | G01C 21/3453 701/415 |
| 2010/0092290 A1* | 4/2010 | Aaron | F03D 3/005 416/9 |
| 2011/0127109 A1* | 6/2011 | Teichert | F03D 80/50 182/19 |
| 2011/0295569 A1* | 12/2011 | Hamke | G01P 7/00 703/2 |
| 2012/0133138 A1* | 5/2012 | Sorensen | F03D 7/028 290/44 |
| 2012/0183399 A1* | 7/2012 | Perkinson | F03D 7/0224 416/1 |
| 2012/0271576 A1* | 10/2012 | Kamel | H02J 13/0006 702/62 |
| 2014/0066003 A1* | 3/2014 | Emerson | G08B 25/08 455/404.2 |
| 2014/0169936 A1* | 6/2014 | Wu | F04D 29/58 415/1 |
| 2014/0190248 A1* | 7/2014 | Moran | G01W 1/02 73/170.17 |
| 2014/0239640 A1* | 8/2014 | Li | F03D 7/047 290/44 |
| 2014/0303966 A1* | 10/2014 | Adachi | H04M 1/6075 704/201 |
| 2014/0377064 A1* | 12/2014 | Kristoffersen | F03D 7/0224 416/1 |
| 2015/0120126 A1* | 4/2015 | So | G01C 23/00 701/26 |
| 2015/0333393 A1* | 11/2015 | Johnson | H01Q 1/1257 455/42 |

* cited by examiner

WIND SENSOR MOTION COMPENSATION SYSTEMS AND METHODS

CROSS-REFERENCE TO RELATED APPLICATIONS

This patent application is a continuation of International Application No. PCT/US2014/026725, filed Mar. 13, 2014 and entitled "WIND SENSOR MOTION COMPENSATION SYSTEMS AND METHODS," the entire contents of which are hereby expressly incorporated by reference.

International Application No. PCT/US2014/026725 claims priority to and the benefit of U.S. Provisional Application 61/785,327, filed on Mar. 14, 2013 and entitled "WIND SENSOR MOTION COMPENSATION SYSTEMS AND METHODS," the entire contents of which are hereby expressly incorporated by reference.

TECHNICAL FIELD

One or more embodiments of the invention relate generally to sensor motion compensation and more particularly, for example, to systems and methods for wind sensor motion compensation.

BACKGROUND

Wind sensors can be used to measure a local wind velocity (e.g., wind direction and magnitude/speed) for stationary and/or moveable platforms. When a wind sensor is mounted to a stationary platform, such as a weather station mounted to a building and/or the ground, the wind velocity measured by the wind sensor is typically relatively stable and accurate. Such measurements may be used to provide reliable information about local environmental conditions. However, when a wind sensor is mounted to a moving platform, such as a vehicle, a mobile weather station, or an animal being studied in the wild, motion of the wind sensor can introduce noise and/or errors into the measured wind velocity. Inaccurate measurements of the local wind velocity can substantially reduce the capability of a data logging, user feedback, or control system relying on the measured wind velocity (e.g., as an input parameter for a vehicle control system, for example) to be an accurate measurement of local environmental conditions.

Various system methodologies have been developed to address motion-related noise in wind sensor data, but conventional methodologies typically introduce additional sources of error, such as measurement timing errors and/or errors in determining a position of the wind sensor relative to the moving platform. Under some conditions, the additional sources of error can reduce the system's overall accuracy to a level below that of an un-compensated system. Conventional steps taken to account for the newly introduced errors can increase the required complexity of the system so as to make it unsuitable for a number of uses, particularly for low-power and/or low-cost implementations. Thus, there is a need for an improved methodology to address wind sensor motion compensation.

SUMMARY

Techniques are disclosed for systems and methods to provide wind sensor motion compensation for wind sensors mounted to moving platforms. In one embodiment, a wind sensor motion compensation system may include a wind sensor, a wind sensor accelerometer, one or more additional sensors, actuators, controllers, user interfaces, and/or other modules mounted to or in proximity to a vehicle. Each electronic device may be implemented with a logic device adapted to form one or more wired and/or wireless communication links for transmitting and/or receiving sensor signals, control signals, or other signals and/or data between the various electronic devices.

In one embodiment, a system includes a logic device configured to receive one or more sensor signals and determine a sensor-motion compensated wind velocity. In some embodiments, the logic device may be adapted to receive a wind sensor acceleration and a relative wind velocity from a wind sensor mounted to a vehicle; determine a wind sensor velocity from the wind sensor acceleration; and determine the sensor-motion compensated relative wind velocity based, at least in part, on a combination of the wind sensor velocity and the relative wind velocity. In some embodiments, the wind sensor acceleration may be measured by a wind sensor accelerometer located substantially near, on, or within a housing for the wind sensor.

In another embodiment, a method includes receiving a wind sensor acceleration and a relative wind velocity from a wind sensor mounted to a vehicle; determining a wind sensor velocity from the wind sensor acceleration; and determining a sensor-motion compensated relative wind velocity based, at least in part, on a combination of the wind sensor velocity and the relative wind velocity. In various embodiments, the wind sensor acceleration may be measured by a wind sensor accelerometer located substantially near, on, or within a housing for the wind sensor. In some embodiments, the method may include determining a vehicle velocity; determining an absolute wind velocity based, at least in part, on a combination of the vehicle velocity with the sensor-motion compensated relative wind velocity; and displaying, using a user interface, a direction and/or magnitude of the absolute wind velocity to a user. In further embodiments, the method may include determining a vehicle velocity based, at least in part, on sensor signals received from one or more of a GPS, an orientation sensor, an accelerometer, or a water speed sensor mounted to the vehicle; and providing a control signal to a steering actuator corresponding to a desired vehicle velocity, wherein the desired vehicle velocity is based, at least in part, on the sensor-motion compensated relative wind velocity and the vehicle velocity.

In a further embodiment, a method includes receiving one or more wind sensor accelerations from a wind sensor accelerometer mounted to a vehicle, where the wind sensor accelerometer may be located substantially on or within a housing for a wind sensor; receiving one or more vehicle accelerations from a vehicle accelerometer; and determining one or more coordinate frame transformations between a coordinate frame of the wind sensor accelerometer and a coordinate frame of the vehicle, where the one or more coordinate frame transformations is based, at least in part, on a comparison of the one or more wind sensor accelerations to the one or more vehicle accelerations. In one embodiment, a coordinate frame of the wind sensor may be aligned with the coordinate frame of the vehicle; and at least one of the coordinate frame transformations may be operable to transform a wind velocity measured by the wind sensor to the coordinate frame of the wind sensor accelerometer.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, wind sensor motion compensation systems and methods may advantageously include a wind sensor and a wind sensor accelerometer providing an accurate measurement of an acceleration of the wind sensor. For example, the wind sensor accelerometer may be located substantially near, on, or within a housing for the wind sensor, or may be integrated with the wind sensor. By providing an accurate measurement of the wind sensor acceleration along with the measured wind velocity, embodiments of the present disclosure can provide a sensor-motion compensated wind velocity that is reliable enough for real-time user feedback and control for a vehicle. Further, embodiments of the present disclosure can be used in conjunction with a mobile platform including low-complexity and/or low-power restrictions.

Figure 1:
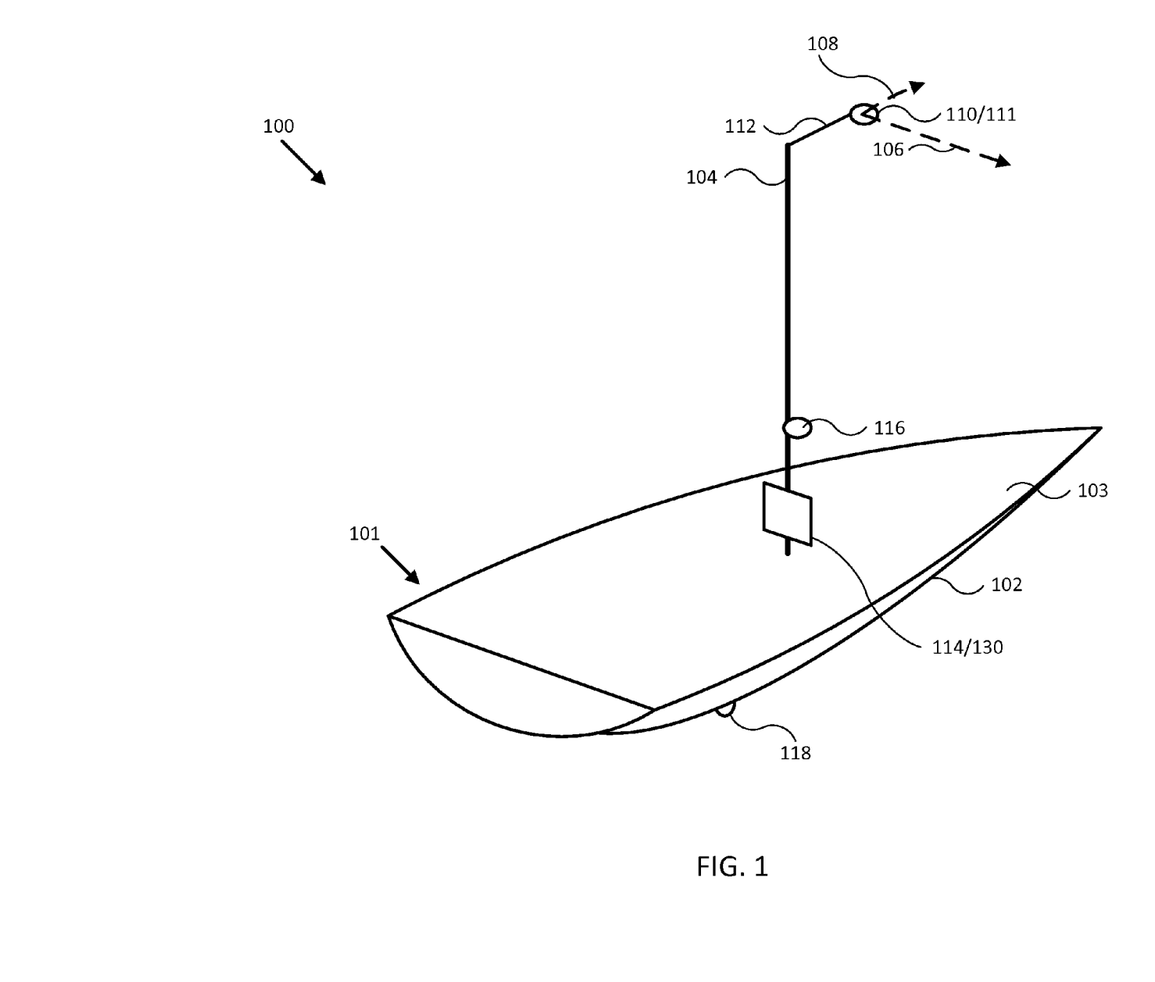
FIG. 1 illustrates a diagram of a wind sensor motion compensation system in accordance with an embodiment of the disclosure.

FIG. 1 illustrates a diagram of a wind sensor motion compensation system 100 in accordance with an embodiment of the disclosure. In the embodiment shown in FIG. 1, system 100 may be implemented to provide wind sensor motion compensation for a particular type of vehicle 101, such as a sailboat, a ship, an automobile, an airplane, a locomotive, and/or other types of vehicles. System 100 may also be implemented to provide wind sensor motion compensation for a variety of other types of mobile platforms.

In one embodiment, system 100 may include one or more of a wind sensor 110 (e.g., physically coupled to vehicle 101 through a mount 112 and/or a mast 104), a wind sensor accelerometer 111, a user interface 114, a controller 130, and one or more other sensors, such as a global positioning satellite system (GPS) 116 and/or a water speed sensor 118. In various embodiments, wind sensor accelerometer 111 may be adapted to provide one or more sensor signals indicating accelerations of wind sensor 110, for example.

In the embodiment illustrated by FIG. 1, vehicle 101 includes hull 102, deck 103, and mast 104. In other embodiments, hull 102, deck 103, and mast 104 may correspond to attributes of a passenger automobile or other type of vehicle, for example, such as an undercarriage, a passenger compartment, an engine compartment, a trunk, a roof, and/or other portions of a vehicle. Directions 106 and 108 describe one possible coordinate frame of wind sensor 110 (e.g., of wind velocities measured by wind sensor 110) and/or wind sensor accelerometer 111 (e.g., of wind sensor accelerations measured by wind sensor accelerometer 111). As shown in FIG. 1, direction 106 illustrates a direction that may be substantially parallel to and/or aligned with a lateral axis of vehicle 101 (e.g., "across" vehicle 101), and direction 108 illustrates a direction that may be substantially parallel to and/or aligned with a longitudinal axis of vehicle 101 (e.g., "along" vehicle 101), as described herein. The longitudinal and lateral axes of vehicle 101 may describe one possible coordinate frame of vehicle 101.

Each of wind sensor 110, wind sensor accelerometer 111, user interface 114, GPS 116, water speed sensor 118, and controller 130 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing wind sensor motion compensation, for example, or for transmitting and/or receiving communications, such as sensor signals, sensor information, and/or control signals, between one or more devices of system 100. In one embodiment, such method may include instructions to determine a sensor-motion compensated relative wind velocity, for example. In another embodiment, such method may include instructions to adjust an orientation of wind sensor 110 and/or wind sensor accelerometer 111, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of wind sensor 110, wind sensor accelerometer 111, user interface 114, GPS 116, water speed sensor 118, and controller 130 may be implemented with one or more amplifiers, modulators, phase adjusters, beamforming components, digital to analog converters (DACs), analog to digital converters (ADCs), various interfaces, antennas, and/or other analog and/or digital components enabling each of the devices of system 100 to transmit and/or receive signals, for example, in order to facilitate wired and/or wireless communications between one or more devices of system 100. Such components may be integrated with a corresponding device of system 100, for example. In some embodiments, the same or similar components may be used to perform one or more sensor measurements, as described herein.

Sensor signals, control signals, and other signals may be communicated among devices of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each device of system 100 may include one or more modules supporting wired, wireless, and/or a combination of wired and wireless communication techniques.

Wind sensor 110 may be implemented as one or more of an anemometer, a wind vane, a hot wire, an unbalanced rotor, an electronic pitot tube and/or other device capable of measuring a relative wind velocity (e.g., speed and direction, relative to a position, orientation, and/or motion of wind sensor 110) of wind substantially near wind sensor 110 and/or vehicle 101 and providing such measurements as sensor signals communicated to various devices of system 100. By general convention, wind velocities may be a measurement of where the wind is blowing to (e.g., a wind destination), or may be a measurement of where the wind is blowing from (e.g., a wind source), where one convention produces directions opposite the other. It is contemplated that wind sensor 110 and any of the methodologies described herein may be adapted to conform to any such conventions.

As noted herein, wind sensor 110 may be implemented with an antenna, a logic device, and/or other analog and/or digital components enabling wind sensor 110 to provide, receive, and process sensor signals and communicate with one or more devices of system 100. Further, a logic device of wind sensor 110 may be adapted to perform any of the methods described herein.

As shown in FIG. 1, in some embodiments, wind sensor 110 may be mounted to a portion of vehicle 101 substantially above a typical user level, such as to a masthead of mast 104. Wind sensor 110 may include one or more batteries and/or other electrical power storage devices, for example, and may include one or more solar cells and/or wind-powered turbines to generate electrical power. In some embodiments, wind sensor 110 may be powered by a power source for vehicle 101, for example, using one or more power leads.

Also shown in FIG. 1 is mount 112 attaching wind sensor 110 to vehicle 101 and/or mast 104. In some embodiments, mount 112 may be adapted to provide a thin profile to reduce and/or avoid wind drag. In various embodiments, wind sensor 110 and/or mount 112 may include gimbals and other leveling mechanisms adapted to substantially maintain a relative orientation of wind sensor 110 to a horizon and/or a gravitational defined "down" vector.

In some embodiments, wind sensor 110 and/or mount 112 may include a level or other type of leveling sensor adapted to measure (and provide such measurements as sensor signals) a roll, a pitch, or a combination of roll and pitch of wind sensor 110 relative to a "down" vector, for example, and/or relative to an at-rest orientation of vehicle 101 (e.g., when vehicle 101 is substantially level and experiencing little or no pitch and/or roll relative to a "down" vector). For example, such measurements may represent a deviation of an orientation of wind sensor 110 from an at-rest orientation of vehicle 101 and/or an at-rest orientation of wind sensor 110. In embodiments where an orientation of wind sensor 110 is fixed relative to vehicle 101, such measurements may represent a deviation from an at-rest and/or calibration orientation of wind sensor 110, as described herein.

In various embodiments, a position and/or orientation of wind sensor 110 and/or mount 112 may be adjusted in order to substantially align a coordinate frame of wind sensor 110 (e.g., a coordinate frame of wind velocities measured by wind sensor 110) with a coordinate frame of vehicle 101, such as when vehicle 101 is at-rest, for example. Such coordinate frame alignment may include aligning one, two, or three axes of one coordinate frame (e.g., directions 106 and/or 108) with corresponding axes (e.g., axes 206 and/or 208 of vehicle 101 in FIG. 2) of another coordinate frame.

A coordinate frame of vehicle 101 may be defined in relation to one or more axes (e.g., axes 206 and/or 208 of vehicle 101 in FIG. 2) of vehicle 101. For example, in one embodiment, a coordinate frame of vehicle 101 may be fixed in relation to longitudinal, lateral, and vertical axes of vehicle 101 and thus be defined as fixed in relation to any orientation of vehicle 101. In another embodiment, a coordinate frame of vehicle 101 may be defined with a first axis that is orthogonal to a gravitationally defined "down" vector (e.g., local to vehicle 101) and in a plane defined by a longitudinal axis of vehicle 101 and the "down" vector, for example, and a second axis orthogonal to the first axis and orthogonal to the "down" vector, such that an angular difference between the first axis and True North represents a heading of vehicle 101 (e.g., a cardinal direction referenced to True North and typically confined to a plane perpendicular to the "down" vector local to vehicle 101).

In various embodiments, True North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" wind velocity, or an "absolute" vehicle velocity).

In some embodiments, wind sensor 110 and/or mount 112 may include servos that may be selectively powered (e.g., by a logic device of wind sensor 110) to adjust a position and/or orientation of wind sensor 110 to achieve alignment of coordinate frames. In further embodiments, a logic device (e.g., of wind sensor 110, user interface 114, and/or controller 130) may be adapted to receive sensor signals from one or more devices of system 100 (e.g., orientation sensor 240 or gyroscope/accelerometer 242 of FIG. 2 and/or a leveling sensor of wind sensor 110) and determine which adjustments are necessary to substantially align coordinate frames. Such determined adjustments may be used to selectively power adjustment servos, for example, or may be communicated to a user through user interface 114.

In similar embodiments, a logic device of wind sensor 110 and/or another device of system 100 may be adapted to determine parameters for transforming a coordinate frame of wind sensor 110 to and/or from a coordinate frame of vehicle 101, for example, or to and/or from other coordinate frames, as described herein. For example, various measurements from wind sensor 110 (e.g., including a leveling sensor of wind sensor 110), wind sensor accelerometer 111, orientation sensor 240, gyroscope/accelerometer 242, and/or other sensors of systems 100 and 200 of FIGS. 1 and 2 may be used to determine parameters for various coordinate frame transformations while vehicle 101 is at-rest (e.g., an at-rest coordinate frame transformation). In other embodiments, various measurements from one or more sensors of systems 100 and 200 may be used to determine parameters for various coordinate frame transformations while vehicle 101 is in motion (e.g., an in-motion coordinate frame transformation).

In one embodiment, measurements from a leveling sensor of wind sensor 110 and gyroscope/accelerometer 242, for example, may be used to determine a relative orientation of wind sensor 110 to vehicle 101, and the relative orientation may be used to determine parameters for a coordinate frame transformation between relative wind velocities measured by wind sensor 110 and a coordinate frame of vehicle 101. In another embodiment, such relative orientation may be determined by comparing measurements from wind sensor accelerometer 111 with measurements from, for example, gyroscope/accelerometer 242 (e.g., where a coordinate frame of wind sensor accelerometer 111 is substantially aligned with that of wind sensor 110). In a further embodiment, such relative orientation may be determined, at least in part, from user input provided to user interface 114. In general, relative orientations of various directional sensors of systems 100 and/or 200 of FIGS. 1 and 2 may be determined using any combination of corresponding directional measurements and or user inputs, either while vehicle 101 is at-rest or in-motion.

In one embodiment, a coordinate frame transformation may be used in place of, or to supplement, a physical adjustment of wind sensor 110 and/or mount 112 to align a coordinate frame of wind sensor 110 with a coordinate frame of vehicle 101. For example, parameters for such a coordinate frame transformation may be stored in a memory of one or more devices of system 100 for repeated use when transforming a coordinate frame of measurements made by wind sensor 110 to or from a coordinate frame of vehicle 101. Furthermore, such parameters may be used to determine and/or calculate one or more adjustments to an orientation of wind sensor 110 that would be necessary to physically align a coordinate frame of wind sensor 110 with a coordinate frame of vehicle 101. Adjustments determined from such parameters may be used to selectively power adjustment servos, for example, or may be communicated to a user through user interface 114, as described herein.

In some embodiments, wind sensor 110 may be fixed relative to a coordinate frame of vehicle 101, and one or more logic devices of system 100 may be adapted to use a calibrated and/or an at-rest coordinate frame transformation, as described herein, to transform a coordinate frame of wind sensor 110 to and/or from a coordinate frame of vehicle 101 while vehicle 101 is in motion.

Wind sensor accelerometer 111 may be implemented as one or more accelerometer sensors, accelerometer sensor systems, and/or other devices capable of measuring a wind sensor acceleration (e.g., direction and magnitude) of wind sensor 110 and providing such measurements as sensor signals communicated to various devices of system 100. Wind sensor accelerometer 111 may be adapted to measure an acceleration of wind sensor 110 in relation to at least two substantially orthogonal axes defining a coordinate frame of wind sensor accelerometer 111 (e.g., a coordinate frame of the wind sensor accelerations measured by wind sensor accelerometer 111).

In some embodiments, wind sensor accelerometer 111 may be a three-axis accelerometer arranged so that one of the axes is substantially unused. For example, an unused third axis of wind sensor accelerometer 111 may be substantially aligned with a vertical axis of vehicle 101 (e.g., a vertical axis substantially parallel with mast 104). In other embodiments, all three axes of a three-axis accelerometer may be used to measure a wind sensor acceleration.

As shown in FIG. 1, wind sensor accelerometer 111 may be located substantially near, on, or within a housing for wind sensor 110. In some embodiments, wind sensor accelerometer 111 may be integrated with wind sensor 110, for example, or may be integrated onto a printed circuit board (PCB) of wind sensor 110 to reduce system complexity, manufacturing costs, power requirements, and/or timing errors between measurements of wind velocity and wind sensor acceleration. For example, wind sensor 110 and wind sensor accelerometer 111 may be configured to share one or more components, such as a memory, a logic device, a communications module, and/or other components, and such sharing may act to reduce and/or substantially eliminate such timing errors while reducing overall system complexity and/or cost.

In embodiments where wind sensor accelerometer 111 is mounted near wind sensor 110, a position and/or orientation of wind sensor accelerometer 111 may be adjusted in order to substantially align a coordinate frame of wind sensor accelerometer 111 with a coordinate frame of wind sensor 110 and/or vehicle 101, similar to adjustments made with respect to wind sensor 110 and vehicle 101, described herein. In embodiments where wind sensor accelerometer 111 is mounted on or within a housing for wind sensor 110, and/or otherwise integrated with wind sensor 110, a coordinate frame of wind sensor accelerometer 111 may be substantially aligned with and/or calibrated with respect to a coordinate frame of wind sensor 110 before the devices are mounted to vehicle 101. For example, alignment of sensor coordinate frames may be achieved using methods (e.g., physical and/or computational alignment methods) similar to those used to align a coordinate frame of wind sensor 110 to a coordinate frame of vehicle 101, as described herein.

In various embodiments, a logic device (e.g., of wind sensor 110, wind sensor accelerometer 111, and/or other devices of system 100) may be adapted to determine parameters (e.g., using signals from various devices of system 100) for transforming a coordinate frame of wind sensor accelerometer 111 to/from a coordinate frame of wind sensor 110, a coordinate frame of vehicle 101, at-rest and/or in-motion, and/or other coordinate frames, as described herein. One or more logic devices of system 100 may be adapted to use such parameters to transform a coordinate frame of wind sensor accelerometer 111 to/from a coordinate frame of wind sensor 110 and/or vehicle 101, for example. Furthermore, such parameters may be used to determine and/or calculate one or more adjustments to an orientation of wind sensor accelerometer 111 that would be necessary to physically align a coordinate frame of wind sensor accelerometer 111 with a coordinate frame of wind sensor 110 and/or vehicle 101. Adjustments determined from such parameters may be used to selectively power adjustment servos (e.g., of wind sensor accelerometer 111), for example, or may be communicated to a user through user interface 114, as described herein.

User interface 114 may be implemented as a display, a touch screen, a keyboard, a mouse, a joystick, a knob, a steering wheel, a ship's wheel, a yolk, and/or any other device capable of accepting user input and/or providing feedback to a user. In various embodiments, user interface 114 may be adapted to provide user input (e.g., as a type of signal and/or sensor information) to other devices of system 100, such as wind sensor 110 and/or controller 130.

In one embodiment, user interface 114 may be mounted to vehicle 101 substantially near a mastfoot of mast 104. Such mount may be fixed, for example, or may include gimbals and other leveling mechanisms so that a display of user interface 114 stays substantially level with respect to a horizon and/or a "down" vector. In another embodiment, user interface 114 may be located in proximity to vehicle 101 and be mobile throughout a user level (e.g., deck 103) of vehicle 101. For example, user interface 114 may be implemented with a lanyard and/or other type of strap and/or attachment device and be physically coupled to a user of vehicle 101 so as to be in proximity to vehicle 101. In various embodiments, user interface 114 may be implemented with a relatively thin display that is integrated into a PCB of the corresponding user interface in order to reduce size, weight, housing complexity, and/or manufacturing costs.

User interface 114 may be implemented with one or more logic devices that may be adapted to execute instructions, such as software instructions, implementing any of the various processes and/or methods described herein. For example, user interface 114 may be adapted to form communication links, transmit and/or receive communications (e.g., sensor signals, control signals, sensor information, user input, and/or other information), determine sensor-motion compensated relative wind velocities, adjust positions and/or orientations of wind sensor 110 and/or wind sensor accelerometer 111, determine parameters for one or more coordinate frame transformations, and/or perform coordinate frame transformations, for example, or to perform various other processes and/or methods.

In various embodiments, user interface 114 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of wind sensor 110, wind sensor accelerometer 111, and/or mount 112, and/or to otherwise facilitate operation of system 100 and devices within system 100. Once user interface 114 accepts a user input, the user input may be transmitted to other devices of system 100 over one or more communication links.

In one embodiment, user interface 114 may be adapted to receive a sensor signal (e.g., from wind sensor 110 and/or wind sensor accelerometer 111) over communication links formed by one or more associated logic devices, for example, and display sensor information corresponding to the received sensor signal to a user. In related embodiments, user interface 114 may be adapted to process sensor signals to determine sensor information.

For example, a sensor signal may include a relative wind velocity measured in units of meters/second and in a coordinate frame of wind sensor 110. In such embodiment, user interface 114 may be adapted to process the sensor signal to determine sensor information indicating a relative wind velocity in units of knots, for example, and/or indicating a wind velocity referenced to a different coordinate frame, such as a coordinate frame of vehicle 101, or an absolute coordinate frame (e.g., resulting in an absolute wind velocity). In one embodiment, an absolute coordinate frame may be defined by a cardinal direction used to indicate a heading of vehicle 101, for example, where the cardinal direction is referenced to True North and is typically confined to a plane perpendicular to a "down" vector local to vehicle 101, regardless of a roll and/or pitch of vehicle 101 or where vehicle 101 is located.

In some embodiments, user interface 114 may be adapted to receive one or more sensor signals including a heading of vehicle 101 (e.g., from orientation sensor 240 in FIG. 2), a relative wind velocity, and/or a wind sensor acceleration, for example, and use the sensor signals and/or sensor information to determine a sensor-motion compensated relative wind velocity, for example, or an absolute wind velocity (e.g., using one or more coordinate frame transforms and/or various other processes described herein). User interface 114 may be adapted to display sensor information to a user, for example, and/or to transmit sensor information to other user interfaces, sensors, or controllers of system 100, for instance, for display and/or further processing.

In further embodiments, user interface 114 may be adapted to receive sensor signals from wind sensor 110 including a measurement of roll and/or pitch of wind sensor 110 (e.g., rotation of wind sensor 110 about direction 108 and/or 106), for example, while vehicle 101 is at rest (e.g., while wind sensor accelerometer 111 and/or other sensors of system 100 are measuring substantially no motion or acceleration of wind sensor 110 and/or vehicle 101). For example, user interface 114 may be adapted to display the roll and/or pitch of wind sensor 110, to determine and/or display an adjustment for a position and/or orientation of wind sensor 110 and/or mount 112 to substantially align a coordinate frame of wind sensor 110 with a coordinate frame of vehicle 100, and/or to determine parameters for an at-rest coordinate frame transformation, as described herein.

In related embodiments, user interface 114 may be adapted to transmit control signals to wind sensor 110 to actuate servos for adjusting a position and/or orientation of wind sensor 110, for example, or to store parameters for the at-rest coordinate frame transformation (e.g., to calibrate and/or "zero" wind sensor 110 with respect to the relative orientation of vehicle 101, True North, and/or one or more other coordinate frames and/or directions). In such embodiments, the control signals may be transmitted in accordance with one or more user inputs, for example, and/or may be transmitted according to software instructions executed by a logic device of user interface 114, such as software instructions to calibrate wind sensor 110. Similar methodologies may be used to adjust and/or calibrate a position and/or orientation of wind sensor accelerometer 111 with respect to wind sensor 110, vehicle 101, and/or other coordinate frames and/or directions.

GPS 116 may be implemented as a global positioning satellite receiver and/or other device capable of determining absolute and/or relative position of vehicle 101 based on wireless signals received from space-born and/or terrestrial sources, for example, and capable of providing such measurements as sensor signals that may be communicated to various devices of system 100. In some embodiments, GPS 116 may be adapted to determine a velocity of vehicle 101 (e.g., using a series of position measurements), such as an absolute velocity of vehicle 101.

Figure 2:
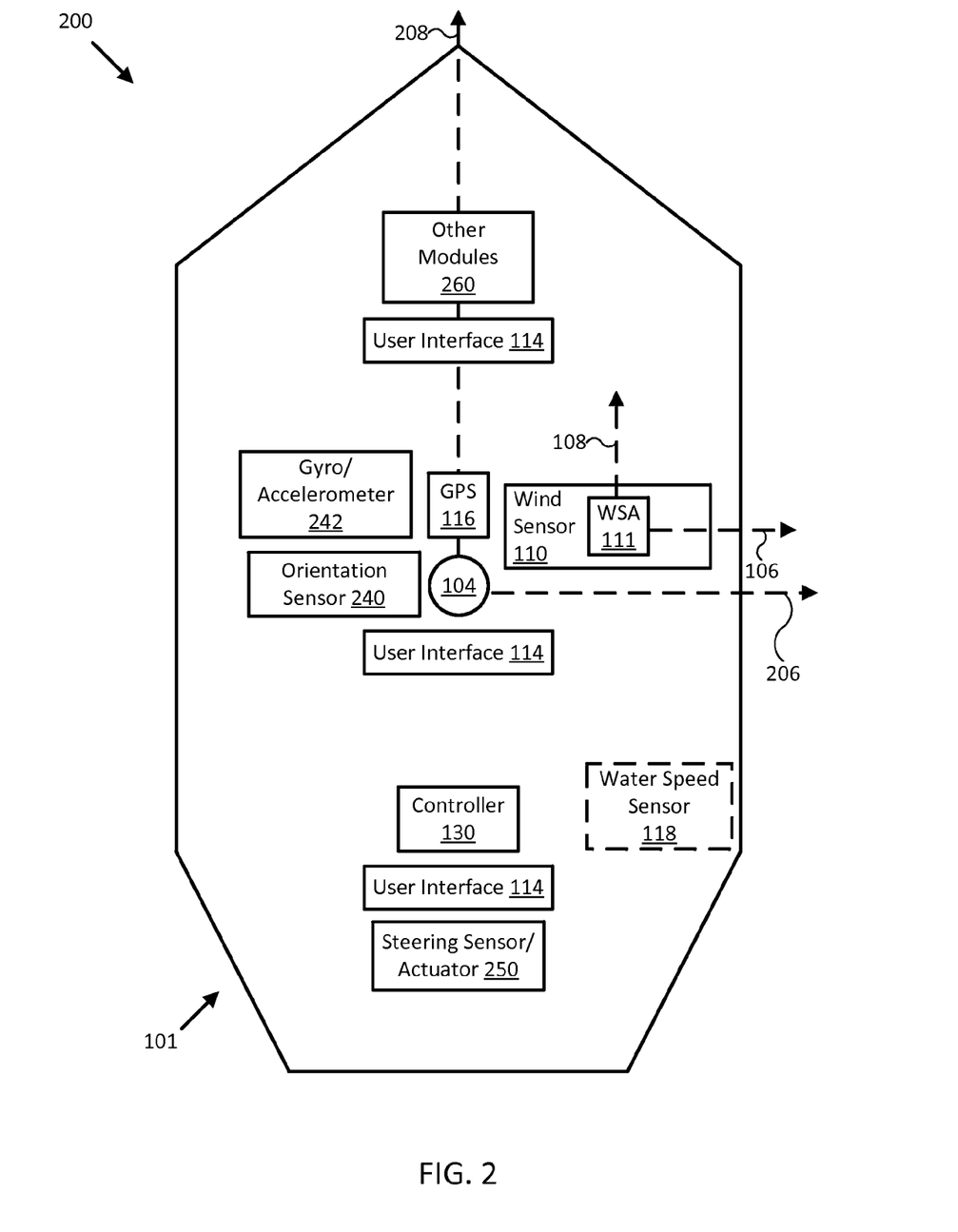
FIG. 2 illustrates a block diagram of a wind sensor motion compensation system in accordance with an embodiment of the disclosure.

Water speed sensor 118 may be implemented as an electronic pitot tube and/or other device capable of measuring a linear water speed and/or direction of water near vehicle 101 (e.g., a relative water velocity) and providing such measurements as sensor signals communicated to various devices of system 100. In some embodiments, an apparent wind velocity (e.g., a relative wind velocity, or a sensor-motion compensated relative wind velocity) may be combined with the relative water velocity (e.g., where both velocities are first transformed to a common coordinate frame, such as a coordinate frame of vehicle 101, for example) to determine a Sailing Wind for vehicle 101. For example, a Sailing Wind may be defined as the wind velocity (direction and magnitude) experienced by a free floating object that has zero relative motion with respect to the local body of water in which it is located. The Sailing Wind direction may be defined as the direction from which the wind is blowing, and it may be represented in a coordinate frame of vehicle 101 (e.g., referenced to longitudinal axis 206 of vehicle 101).

In related embodiments, the absolute velocity of vehicle 101 (e.g., measured by GPS 116) may be combined with an absolute water velocity (e.g., a relative water velocity transformed to an absolute coordinate frame) to determine an absolute tide velocity. In further embodiments, an apparent wind velocity (e.g., transformed to the same absolute coordinate frame used for the absolute tide velocity) may be combined with the absolute tide velocity to determine a Ground Wind. For example, a Ground Wind may be defined as the wind velocity (direction and magnitude) experienced by an object that has zero relative motion with respect to the earth, i.e. a constant latitude and longitude. The Ground Wind direction may be defined as the absolute direction from which the wind is blowing, and it may be represented in an absolute coordinate frame (e.g., referenced to True North or Magnetic North). Under circumstances where the tide velocity is zero, the Sailing Wind and the Ground Wind will typically have the same magnitude but be represented in different coordinate frames.

As shown in FIG. 1, in some embodiments, water speed sensor 118 may be mounted to a portion of vehicle 101 substantially below a typical user level, such as to hull 102. Water speed sensor 118 may be adapted to provide a thin profile to reduce and/or avoid water drag. Water speed sensor 118 may include one or more batteries and/or other electrical power storage devices, for example, and may include one or more water-powered turbines to generate electrical power. In other embodiments, water speed sensor 118 may be powered by a power source for vehicle 101, for example, using one or more power leads penetrating hull 102. In various embodiments, a position and/or orientation of water speed sensor 118 may be adjusted in order to substantially align a coordinate frame of water speed sensor 118 (e.g., of water speed directions measured by water speed sensor 18) to a coordinate frame of vehicle 101.

In further embodiments, water speed sensor 118 may be implemented with a water speed sensor accelerometer, similar to wind sensor accelerometer 111 of wind sensor 110, for example. In such embodiments, any of the methodologies described herein with respect to wind sensor 110 and/or wind sensor accelerometer 111 (e.g., alignment, coordinate frame transforms; motion compensation, and/or other methods described herein) may be used in a similar fashion with embodiments of water speed sensor 118 including a water speed sensor accelerometer. More generally, any sensor of system 100 of FIG. 1 and/or system 200 of FIG. 2 may be implemented with a sensor accelerometer, and any of the methodologies described herein with respect to wind sensor 110 and/or wind sensor accelerometer 111 may be adapted for use in such embodiments to align a sensor, determine parameters for a coordinate frame transform, to compensate for motion of the sensor, and/or perform other methods described herein.

As noted herein, GPS 116 and/or water speed sensor 118 may be implemented with antennas, logic devices, and/or other analog and/or digital components enabling GPS 116 and/or water speed sensor 118 to interface with, provide signals, receive signals, and otherwise communicate with one or more devices of system 100.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of vehicle 101, for example. Such software instructions may also implement methods for processing sensor signals, determining sensor information, providing user feedback (e.g., through user interface 114), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, or other operational parameters, over time, for example, and provide such stored data to a user using user interface 114. In some embodiments, controller 130 may be integrated with one or more user interfaces (e.g., user interface 114), and, in one embodiment, may share a communication module or modules. As noted herein, controller 130 may be adapted to execute one or more control loops for steering control (e.g., through steering actuator 250 of FIG. 2), collision avoidance, and/or performing other various operations of vehicle 101. In some embodiments, a control loop may include processing sensor signals and/or sensor information in order to control one or more operations of vehicle 101.

In embodiments where vehicle 101 is a vehicle with a mast, such as a sailboat, for example, typical distances between wind sensor 110 and user interface 114 may be 25 meters, and wind sensor 110 and wind sensor accelerometer 111 may not receive power from a power source for vehicle 101. In similar embodiments, where physical access to a device of system 101 is limited, reducing overall power usage substantially increases the utility of the device while increasing Overall convenience.

By locating wind sensor accelerometer 111 near or within wind sensor 110, embodiments of the present disclosure provide measurements of accelerations of wind sensor 110 that are accurate substantially to the limit of accuracy of the accelerometer used to implement wind sensor accelerometer 111. Further, wind velocity measurements may be made, transmitted, and/or stored at substantially the same time and/or using substantially the same components as those used for wind sensor acceleration measurements, thus substantially eliminating motion compensation errors due to measurement timing mismatches. For example, in one embodiment, a logic device of wind sensor 110 may be adapted to provide measurements of wind velocities and wind sensor accelerations (e.g., made by wind sensor accelerometer 111) as sensor signals communicated to various devices of system 100. Conventional methods to overcome measurement timing errors, particularly in real-time, typically require substantial increases in system complexity and/or power usage related to increasing communication bandwidths and/or sensor sampling rates. Thus, embodiments of the present disclosure provide substantial benefits over conventional systems in terms of increased accuracy, lower system complexity, lower power requirements, and lower overall cost.

FIG. 2 illustrates a diagram of a wind sensor motion compensation system 200 in accordance with an embodiment of the disclosure. In the embodiment shown in FIG. 2, system 200 may be implemented to provide wind sensor motion compensation for vehicle 101, similar to system 100 of FIG. 1. For example, system 200 may include wind sensor 110, wind sensor accelerometer 111, user interfaces 114, controller 130, and various other sensors and/or actuators. Wind sensor accelerometer 111 may be adapted to provide one or more sensor signals indicating accelerations of wind sensor 110.

In the embodiment illustrated by FIG. 2, vehicle 101 includes lateral axis 206 and longitudinal axis 208 meeting at mast 104 (e.g., near a center of gravity of vehicle 101). In one embodiment, lateral axis 206 and/or longitudinal axis 208 may define a coordinate frame of vehicle 101. As can be seen from FIG. 2, direction 106 is substantially parallel to and/or aligned with lateral axis 206 of vehicle 101 (e.g., "across" vehicle 101), and direction 108 is substantially parallel to and/or aligned with longitudinal axis 208 of vehicle 101 (e.g., "along" vehicle 101), as described herein. Each sensor device adapted to measure a direction (e.g., velocities, accelerations, angular rotations, or other states including a directional component) may be implemented with a mount, actuators, and/or servos that can be used to align a coordinate frame of the sensor device with a coordinate frame of any device of system 100 and/or vehicle 101.

Although the various devices of system 200 are shown without perspective in FIG. 2, each device may be located at, above, or below a typical user level, for example, and may be located at positions different from those depicted in FIG. 2. For example, in one embodiment, wind sensor 110 may be located substantially above a user level of vehicle 101, such as at a mast head of mast 104, and in other embodiments, at a different position along mast 104. In some embodiments, water speed sensor 118, drawn with a dashed line to indicate a position below a user level of vehicle 101, may be located nearer to longitudinal axis 108.

Each of user interfaces 114, controller 130, wind sensor 110, wind speed accelerometer 111, GPS 116, water speed sensor 118, orientation sensor 240, gyroscope and/or accelerometer 242, steering sensor/actuator 250, and one or more other modules 260 may be implemented with any appropriate logic device that may be adapted to execute, store, and/or receive appropriate instructions, such as software instructions implementing one, or more of the methods and/or operations described herein. For example, such methods may include instructions to process sensor signals, provide wind sensor motion compensation, determine parameters for coordinate frame transformations, perform coordinate frame transforms, or for transmitting and/or receiving communications between one or more devices of system 200. In one embodiment, such methods may include instructions to determine a sensor-motion compensated relative wind velocity, for example, or to adjust an orientation of wind sensor 110, wind sensor accelerometer 111, and/or other devices of system 200, as described herein. In another embodiment, such methods may include instructions to determine parameters for transforming a coordinate frame of one directional sensor of system 200 to and/or from other coordinate frames.

In addition, each of the devices of system 200 may be implemented with various integrated and/or removable machine readable mediums, antennas, various interfaces, and various analog and/or digital components enabling each of the devices of system 200 to communicate with one or more other devices of system 200. Furthermore, in some embodiments, one or more directional sensors of system 200 may be implemented with a level or other type of leveling sensor adapted to measure a roll, a pitch, or a combination of roll and pitch of its corresponding directional sensor relative to a "down" vector and/or an at-rest orientation of vehicle 101.

Orientation sensor 240 may be implemented as an electronic compass, sextant, or other device capable of measuring a heading and other absolute and/or relative orientation states of vehicle 101 and providing such measurements as sensor signals that may be communicated to other devices of system 200 (e.g., user interfaces 114, controller 130).

Gyroscope and/or accelerometer 242 may be implemented as one or more gyroscopes, accelerometers, and/or other devices capable of measuring absolute and/or relative orientation states, angular velocities, angular accelerations, and/or linear accelerations of vehicle 101 and providing such measurements as sensor signals that may be communicated to other devices of system 200.

Steering sensor/actuator 250 may be adapted to sense and/or physically adjust a steering mechanism for vehicle 101 according to one or more control signals (e.g., a steering demand) provided by controller 130. Steering sensor/actuator 250 may be physically coupled to a rudder of vehicle 101, for example, and may be adapted to physically adjust the rudder to a variety of positive and/or negative steering angles.

Other modules 260 may include other and/or additional sensors, actuators, communications modules/nodes, and/or user interface devices used to provide additional environmental information of vehicle 101, for example. In some embodiments, other modules 260 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 200 (e.g., controller 130) to provide operational control of vehicle 101 that compensates for environmental conditions, such as wind speed and/or direction, swell speed, amplitude, and/or direction, and/or an object in a path of vehicle 101, for example.

In various embodiments, one or more of orientation sensor 240, gyroscope/accelerometer 242, steering sensor/actuator 250, and/or other modules 260, may be mounted to a portion of vehicle 101 substantially above, below, or at a typical user level. Each device may include one or more batteries or other electrical power storage devices, for example, and may include one or more solar cells or other electrical power generating devices. In some embodiments, one or more of the devices may be powered by a power source for vehicle 101.

Figure 3:
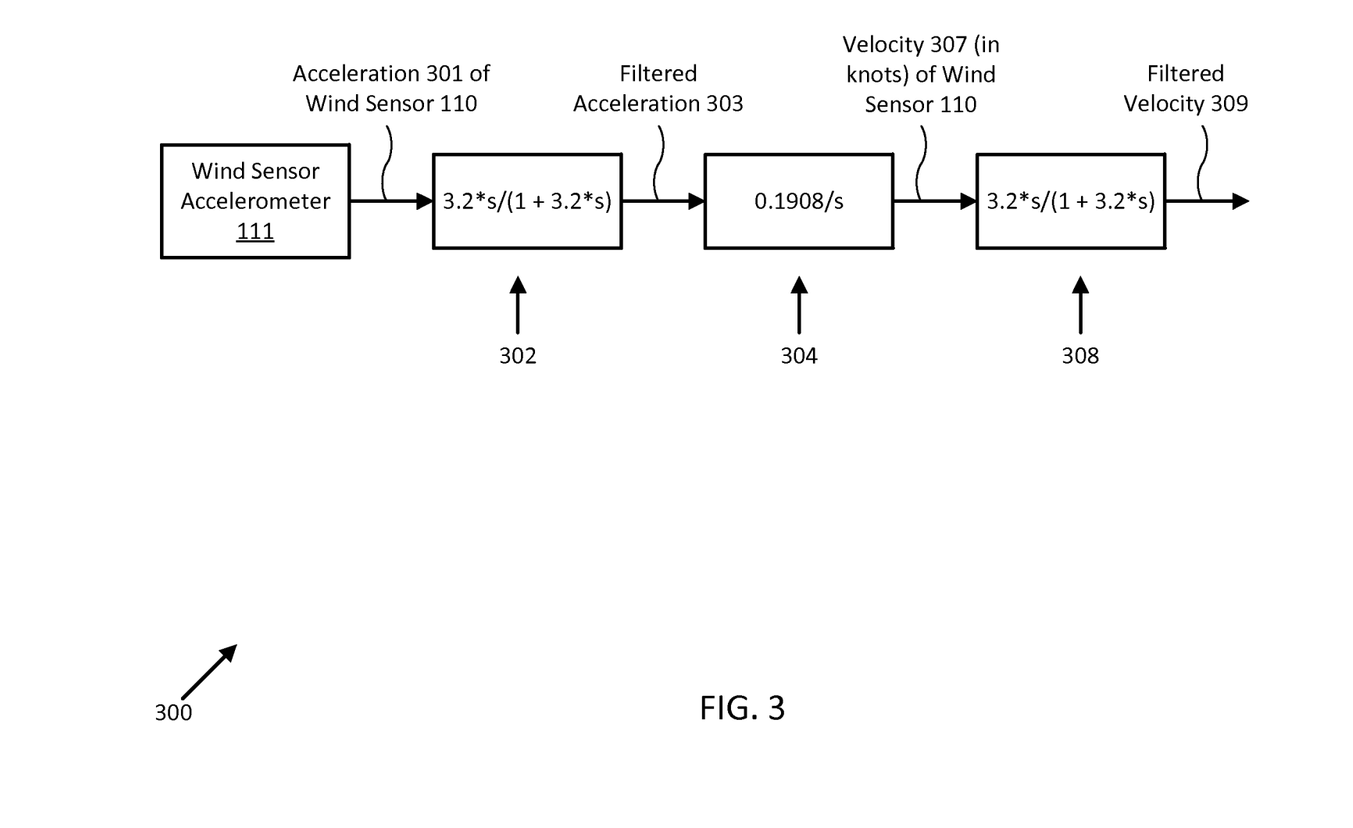
FIG. 3 illustrates a flow diagram of various operations to provide wind sensor motion compensation in accordance with an embodiment of the disclosure.

FIG. 3 illustrates a flow diagram of process 300 to provide wind sensor motion compensation for wind sensor 110 of vehicle 101 in accordance with an embodiment of the disclosure. In some embodiments, the operations of FIG. 3 may be implemented as software instructions executed by one or more logic devices associated with corresponding electronic devices and/or sensors of system 100 of FIG. 1 and/or system 200 of FIG. 2. More generally, the operations of FIG. 3 may be implemented with any combination of software instructions and/or electronic hardware (e.g., inductors, capacitors, amplifiers, or other analog and/or digital components).

It should be appreciated that any step, sub-step, sub-process, or block of process 300 may be performed in an order or arrangement different from the embodiment illustrated by FIG. 3. For example, in other embodiments, either or both blocks 302 and 308 may be omitted from process 300. Furthermore, block inputs, block outputs, various sensor signals, sensor information, and/or other operational parameters may be stored to one or more memories of systems 100 and/or 200 prior to moving to a following portion of process 300. Although process 300 is described with reference to systems 100 and 200, process 300 may be performed by other systems different from systems 100 and 200 and including a different selection of electronic devices, sensors, vehicles, and/or vehicle attributes.

In block 302, wind sensor 110 removes low frequency components from a wind sensor acceleration 301 to produce a filtered wind sensor acceleration 303. For example, a logic device of wind sensor 110 may be adapted to receive wind sensor acceleration 301 from wind sensor accelerometer 111, and to high-pass filter wind sensor acceleration 301 to produce filtered wind sensor acceleration 303. In alternative embodiments, block 302 may be performed by a logic device of wind sensor accelerometer 111, user interface 114, controller 130, and/or other devices of systems 100 or 200, for example.

As can be seen from FIG. 3, block 302 may be implemented as a relatively simple transfer function operating in the s-plane, and, in some embodiments, may be characterized by three coefficients. In such embodiments, the multiplicative coefficients (e.g., "3.2") may be chosen to equal each other so that a pass band of the high-pass filter is substantially lossless. In further embodiments, each coefficient may be adjusted (e.g., by wind sensor 110) to change a shape, bandwidth, and/or cutoff frequency of the high-pass filter. For example, wind sensor 110 may be adapted to increase and/or decrease a cut-off frequency of the high-pass filter in accordance with a detected stability of measurements provided by wind sensor accelerometer 111.

More generally, block 302 may be implemented as any combination of software and/or hardware adapted to remove a DC component and/or a low frequency component of wind sensor acceleration 301. For example, a DC and/or low frequency component of wind sensor acceleration 301 may primarily represent thermal and/or other types of sensor drift associated with wind sensor accelerometer 111, and therefore not contribute to an accurate measurement of an acceleration of wind sensor 110. Moreover, DC and/or low frequency accelerations experienced by wind sensor 110 are likely to be motions commensurate with motions of vehicle 101, which may be more accurately measured by other sensors of systems 100 or 200.

In block 304, wind sensor 110 integrates filtered wind sensor acceleration 303 to produce a wind sensor velocity 307. For example, a logic device of wind sensor 110 may be adapted to receive filtered wind sensor acceleration 303 (e.g., from one or more memories of system 100 and/or 200, or as sensor information from one or more devices of system 100 and/or 200) and integrate filtered wind sensor acceleration 303 to produce wind sensor velocity 307. In alternative embodiments, block 304 may be performed by one or more logic devices of various devices of systems 100 or 200, for example.

Block 304 may be implemented as any combination of software and/or hardware adapted to integrate filtered wind sensor acceleration 303. As shown in FIG. 3, in some embodiments, block 304 may be implemented as a relatively simple transfer function operating in the s-plane, and, in some embodiments, may include a single multiplicative coefficient that may be selected (e.g., through user input provided to user interface 114) to convert the units of wind sensor velocity 307 from those used by wind sensor accelerometer ill (e.g., typically thousandths of a "g" measured in SI units) to knots, miles/hour, kilometers/hour, meters/second, or other units selected by a user and/or appropriate for a particular type of vehicle. In some embodiments, the single multiplicative coefficient may be adjusted (e.g., by the device or devices performing block 302) to account for environmental conditions affecting operation of wind sensor accelerometer 111 in a systematic fashion, such as drifts and/or offsets due to changes in local barometric pressure and/or temperature sensed by other modules of system 100 and/or 200. Such adjustments may be used in place of, or as a supplement to, the filtering of block 302.

In block 308, wind sensor 110 removes low frequency components from wind sensor velocity 307 to produce a filtered wind sensor velocity 309. For example, a logic device of wind sensor 110 may be adapted to receive wind sensor velocity 307 (e.g., from one or memories of system 100 and/or 200, or as sensor information from one or more devices of system 100 and/or 200) and to high-pass filter wind sensor velocity 307 to produce filtered wind sensor velocity 309. In alternative embodiments, block 304 may be performed by one or more logic devices of various devices of systems 100 or 200, for example.

Block 308, like block 302, may be implemented as a relatively simple transfer function operating in the s-plane, and, in some embodiments, may be characterized by three coefficients. In such embodiments, the multiplicative coefficients may be chosen to equal each other so that a pass band of the high-pass filter is substantially lossless. In further embodiments, each coefficient may be adjusted to change a shape, bandwidth, and/or cutoff frequency of the high-pass filter. For example, wind sensor 110 may be adapted to increase and/or decrease a cut-off frequency of the high-pass filter in accordance with a detected motion of vehicle 101 (e.g., measured by one or more sensors of systems 100 or 200). In some embodiments, the multiplicative coefficients of block 308 may be substantially the same as those of block 302, for example, such that the respective filter characteristics are substantially the same.

More generally, block 308 may be implemented as any combination of software and/or hardware adapted to remove a DC component and/or a low frequency component of wind sensor velocity 307. For example, DC and/or low frequency velocities experienced by wind sensor 110 are likely to be motions commensurate with motions of vehicle 101 (e.g., steady state motions of vehicle 101), which may be more accurately measured by other sensors of systems 100 or 200. Once filtered wind sensor velocity 309 is determined, it may be combined with a relative wind velocity measured by wind sensor 110 to determine a sensor-motion compensated relative wind velocity, as described herein.

Figure 4:
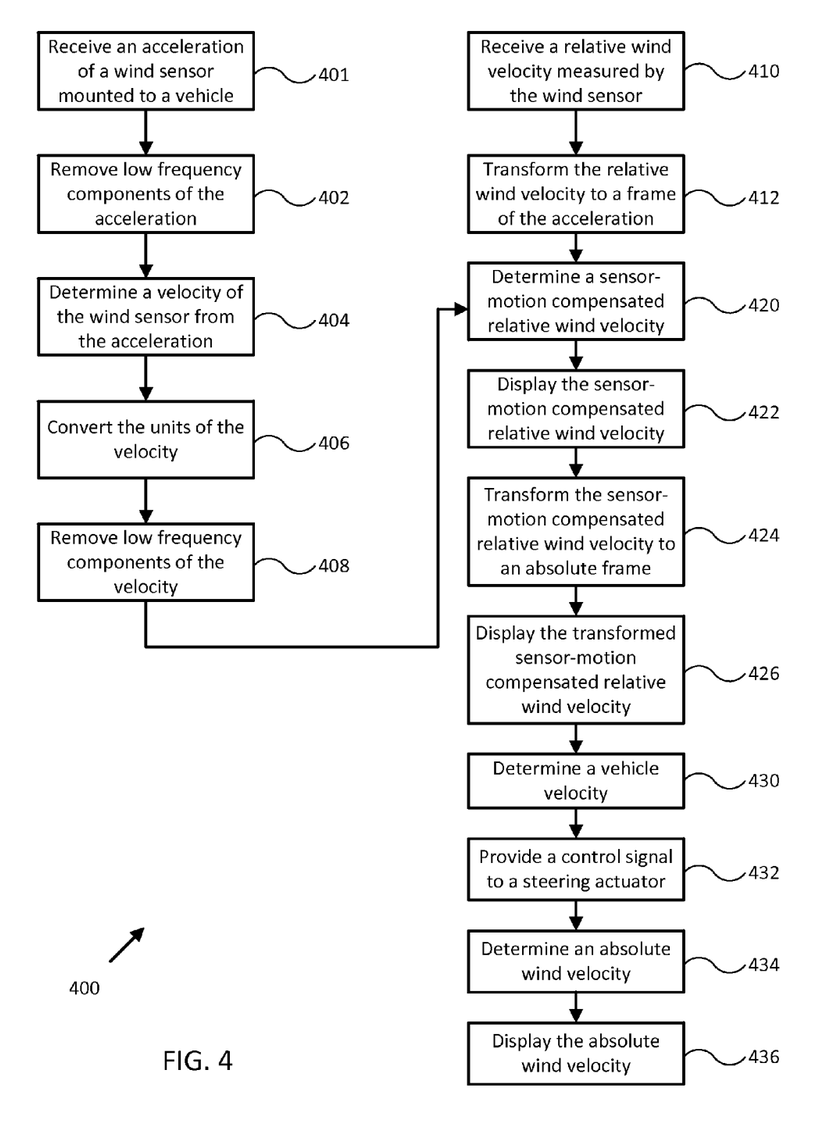
FIG. 4 illustrates a flow diagram of various operations to provide wind sensor motion compensation in accordance with an embodiment of the disclosure.

FIG. 4 illustrates a flow diagram of process 400 to provide wind sensor motion compensation for wind sensor 110 of vehicle 101 in accordance with an embodiment of the disclosure. In some embodiments, the operations of FIG. 4 may be implemented as software instructions executed by one or more logic devices associated with corresponding electronic devices and/or sensors of systems 100 and/or 200. More generally, the operations of FIG. 4 may be implemented with any combination of software instructions and/or electronic hardware (e.g., inductors, capacitors, amplifiers, or other analog and/or digital components).

It should be appreciated that any step, sub-step, sub-process, or block of process 400 may be performed in an order or arrangement different from the embodiment illustrated by FIG. 4. For example, in various embodiments, block 412 may be unnecessary if the relative wind velocity is measured in a coordinate frame of the wind sensor acceleration, blocks 422 and 426 may be omitted in favor of block 436, and blocks 424-436 may be omitted in favor of block 422. In addition, although blocks 401-408 are shown as separate from blocks 410-412, blocks 401-408 and blocks 410-412 may be performed at substantially the same time, for example, and/or by the same logic device. Furthermore, block inputs, block outputs, various sensor signals, sensor information, and/or other operational parameters may be stored to one or more memories of systems 100 and/or 200 prior to moving to a following portion of process 400. Although process 400 is described with reference to systems 100 and 200, process 400 may be performed by other systems different from systems 100 and 200 and including a different selection of electronic devices, sensors, vehicles, and/or vehicle attributes.

In block 401, wind sensor 110 receives a wind sensor acceleration from wind sensor accelerometer 111 mounted to vehicle 101. For example, a logic device of wind sensor 110 may be adapted to receive a wind sensor acceleration as one or more sensor signals transmitted by a logic device of wind sensor accelerometer 111. In embodiments where wind sensor 110 and wind sensor accelerometer 111 are integrated and/or share electrical components, a logic device of wind sensor 110 may receive a wind sensor acceleration directly from an accelerometer of wind sensor accelerometer 111. In further embodiments, block 401 may be performed by a logic device of user interface 114, controller 130, or any other device of system 100 or 200.

In block 402, wind sensor 110 removes low frequency components of the wind sensor acceleration received in block 401. For example, a logic device of wind sensor 110 (e.g., or any other device of system 100 or 200) may be adapted to remove DC and/or low frequency components from a received wind sensor acceleration to, in one embodiment, remove sensor drift and/or motion associated with steady state motion of vehicle 101. In various embodiments, block 402 may be implemented as a high-pass filter (e.g., similar to block 302 in FIG. 3), a low-pass filter (e.g., with its output subtracted from the input signal), and/or a transfer function, for example, adapted to remove DC and/or low frequency components of a received wind sensor acceleration. In some embodiments, parameters and/or coefficients associated with an implementation of block 402 may be may be adjusted to change a shape, bandwidth, and/or cutoff frequency of the implementation in accordance with a detected stability of measurements provided by wind sensor accelerometer 111, as described herein.

In block 404, wind sensor 110 determines a wind sensor velocity from the wind sensor acceleration processed in block 402. For example, a logic device of wind sensor 110 (e.g., or any other device of system 100 or 200) may be adapted to determine a wind sensor velocity by integrating the wind sensor acceleration of block 401 or 402. In various embodiments, block 404 may be implemented as an integrator and/or a transfer function (e.g., similar to block 304 in FIG. 3), for example, adapted to determine a wind sensor velocity from a wind sensor acceleration.

In block 406, wind sensor 110 converts the units of the wind sensor velocity processed in block 404. For example, a logic device of wind sensor 110 (e.g., or any other device of system 100 or 200) may be adapted to convert the units of the wind sensor velocity by multiplying the wind sensor velocity of block 404 by a coefficient selected (e.g., through user input provided to user interface 114) to convert the units of the wind sensor velocity from those used by wind sensor accelerometer 111 to knots and/or other units selected by a user and/or appropriate for a particular type of vehicle.

In some embodiments, the multiplicative coefficient may be adjusted (e.g., by the device or devices performing block 406) to account for environmental conditions affecting operation of wind sensor accelerometer ill in a systematic fashion, such as drifts and/or offsets due to changes in local barometric pressure and/or temperature sensed by other modules of system 100 and/or 200 (e.g., similar to adjusting the multiplicative coefficient in block 304 in FIG. 3). Such adjustments may be used in place of, or as a supplement to, the processing of block 402. Block 406 may be optional depending on user input, for example, and may be integrated with block 404.

In block 408, wind sensor 110 removes low frequency components of the wind sensor velocity processed in blocks 404 and/or 406. For example, a logic device of wind sensor 110 (e.g., or any other device of system 100 or 200) may be adapted to remove DC and/or low frequency components from a wind sensor velocity to, in one embodiment, remove motion associated with steady state motion of vehicle 101. In various embodiments, block 408 may be implemented as a high-pass filter (e.g., similar to block 308 in FIG. 3), a low-pass filter fed back into an input signal, and/or a transfer function, for example, adapted to remove DC and/or low frequency components of a wind sensor velocity provided by block 404 and/or 406. Parameters and/or coefficients associated with an implementation of block 408 may be adjusted to change a shape, bandwidth, and/or cutoff frequency of the implementation in accordance with a detected motion of vehicle 101, for example. In some embodiments, filter characteristics of an implementation of block 408 may substantially match those of block 402.

In block 410, wind sensor 110 receives a relative wind velocity measured by wind sensor 110. For example, a logic device of wind sensor 110 (e.g., or any other device of system 100 or 200, such as user interface 114 and/or controller 130) may be adapted to receive a relative wind velocity measured by wind sensor 110 as one or more sensor signals transmitted by a logic device of wind sensor 110 and/or stored in a memory of wind sensor 110. In embodiments where wind sensor 110 and wind sensor accelerometer 111 are integrated and/or share electrical components, a logic device of wind sensor 110 may receive a relative wind velocity directly from wind sensor of wind sensor 110, and substantially at the same time as receiving a wind sensor acceleration from an accelerometer of wind sensor accelerometer 111. In various embodiments, one or more logic devices of systems 100 or 200 may be adapted to time execution of blocks 401 and/or 410 (e.g., and corresponding sensor measurements) to substantially eliminate timing errors associated with measurement timing mismatch.

In block 412, wind sensor 110 transforms the relative wind velocity received in block 410 to a coordinate frame of the wind sensor acceleration received in block 401. For example, a logic device of wind sensor 110 (e.g., or any other device of system 100 or 200, such as user interface 114 and/or controller 130) may be adapted to apply a coordinate frame transformation to the relative wind velocity received in block 410 to transform the coordinate frame of the relative wind velocity measured by wind sensor 110 to the coordinate frame of the wind sensor acceleration measured by wind sensor accelerometer 111. In some embodiments, a coordinate frame of wind sensor accelerations measured by wind sensor accelerometer 111 may be substantially aligned with a coordinate frame of vehicle 101, for example, or may be calibrated to a coordinate frame of vehicle 101 using an at-rest coordinate frame transform, as described herein.

In alternative embodiments, wind sensor 110 may be adapted to transform the wind sensor velocity processed in block 408 to a coordinate frame of the relative wind velocity, or to transform both to a third coordinate frame, such as a coordinate frame of vehicle 101. Parameters for any such coordinate transformations may be determined using one or more measurements made by various directional sensors of systems 100 and/or 200, user input provided to user interface 114, and various calibration and/or relative orientation determinations, as described herein. In one embodiment, a coordinate frame transformation may be implemented as a relatively simple two dimensional sine/cosine decomposition into components corresponding to axes 206 and 208 of FIG. 2. Regardless, once the relative wind velocity is in the same coordinate frame as the wind sensor velocity processed in block 408, process 410 may proceed to block 420. As such, in embodiments where the coordinate frame of wind sensor 110 is substantially the same as the coordinate frame of wind sensor accelerometer 111, block 412 may be omitted from process 400.

In block 420, wind sensor 110 determines a sensor-motion compensated relative wind velocity from the relative wind velocity processed in block 412 and the wind sensor velocity processed in block 408. For example, a logic device of wind sensor 110 (e.g., or any other device of system 100 or 200, such as user interface 114 and/or controller 130) may be adapted to determine a sensor-motion compensated relative wind velocity by combining the wind sensor velocity processed in block 408 with the relative wind velocity processed in block 412.

For example, in embodiments where wind velocities are a measurement of where the wind is blowing to (e.g., a wind destination, in contrast to where the wind is blowing from, or a wind source), the sensor-motion compensated relative wind velocity may be determined through vector addition of the wind sensor velocity and the relative wind velocity, because a wind sensor velocity will induce a measured relative wind velocity component in a direction opposite to the wind sensor velocity. In embodiments where wind velocities are a measurement of where the wind is blowing from, the sensor-motion compensated relative wind velocity may be determined through vector subtraction of the wind sensor velocity and the relative wind velocity. In some embodiments, block 420 may be implemented with various filters and/or other signal processing operations to smooth, convert, transform, and/or otherwise prepare the sensor-motion compensated relative wind velocity for display and/or further processing.

In block 422, user interface 114 displays the sensor-motion compensated relative wind velocity processed in block 420. For example, a logic device of wind sensor 110 (e.g., or any other device of system 100 or 200) may be adapted to transmit the sensor-motion compensated relative wind velocity processed in block 420 to user interface 114, and a logic device of user interface 114 may be adapted to receive the sensor-motion compensated relative wind velocity and use a display of user interface 114 to display it to a user in proximity to user interface 114. Display of the sensor-motion compensated relative wind velocity may be in accordance with one or more user inputs provided to user input 114, for example, such as a particular units convention, or referenced to a particular orientation of user interface 114 (e.g., where the sensor-motion compensated relative wind velocity is displayed, at least in part, as a graphic that responds to changes in an orientation of user interface 114). In some embodiments, block 422 may be optional depending on user input.

In block 424, wind sensor 110 transforms the sensor-motion compensated relative wind velocity determined in block 420 to an absolute coordinate frame. For example, a logic device of wind sensor 110 (e.g., or any other device of system 100 or 200, such as user interface 114 and/or controller 130) may be adapted to apply a coordinate frame transformation to the sensor-motion compensated relative wind velocity to transform a coordinate frame of the sensor-motion compensated relative wind velocity (e.g., the coordinate frame of wind sensor accelerometer 111) to an absolute coordinate frame, such as one defined by a cardinal direction referenced to True North.

Parameters for any such coordinate transformations may be determined using one or more measurements made by various directional sensors of systems 100 and/or 200, user input provided to user interface 114, and various calibration and/or relative orientation determinations, as described herein. In one embodiment, a coordinate frame transformation may be implemented as a relatively simple two dimensional sine/cosine decomposition into components corresponding to True North and a direction orthogonal to True North and a "down" vector. Regardless, once the sensor-motion compensated relative wind velocity is in the absolute coordinate frame (e.g., resulting in an absolute sensor-motion compensated relative wind velocity), process 400 may proceed to block 426.

In block 426, user interface 114 displays the transformed sensor-motion compensated relative wind velocity processed in block 424. For example, a logic device of wind sensor 110 (e.g., or any other device of system 100 or 200) may be adapted to transmit the transformed sensor-motion compensated relative wind velocity processed in block 424 to user interface 114, and a logic device of user interface 114 may be adapted to receive the transformed sensor-motion compensated relative wind velocity and use a display of user interface 114 to display it to a user in proximity to user interface 114. Display of the transformed sensor-motion compensated relative wind velocity may be in accordance with one or more user inputs provided to user input 114, for example, such as a particular units convention, or referenced to a particular orientation of user interface 114. In some embodiments, block 422 may be optional depending on user input.

In block 430, controller 130 determines a vehicle velocity of vehicle 101. For example, a logic device of controller 130 (e.g., or any other device of system 100 or 200) may be adapted to determine a vehicle velocity from one or more sensor signals, for example, such as sensor signals from GPS 116, water speed sensor 118, orientation sensor 240, gyroscope/accelerometer 242, and/or one or more other modules 260 (e.g., to use environmental conditions to compensate for such in various measurements). In one embodiment, controller 130 may be adapted to determine a relative vehicle velocity referenced to a coordinate frame defined by one or two axes of vehicle 101, such as axes 206 and 208 of FIG. 2. In another embodiment, controller 130 may be adapted to determine an absolute vehicle velocity referenced to an absolute coordinate frame, such as one defined by a cardinal direction referenced to True North.

In block 432, controller 130 provides a control signal to steering sensor/actuator 250. For example, a logic device of controller 130 may be adapted to determine a desired heading and/or a desired vehicle velocity for vehicle 101 based on, for example, a waypoint selected by a user of user interface 114, a current position measured by GPS 116, a maximum allowable heel angle as measured by gyroscope/accelerometer 242, a sensor-motion compensated relative wind velocity determined in block 420, a relative and/or absolute vehicle velocity determined in block 430, a calculated and/or user-selected track from the current position to the waypoint (e.g., that depends, at least in part, on the maximum allowable heel angle, the sensor-motion compensated relative wind velocity, and the relative and/or absolute vehicle velocity), a desired arrival time to the waypoint, and/or other piloting requirements, environmental conditions, and/or operating parameters. Once a desired heading and or vehicle velocity is determined, controller 130 may be adapted to transmit control signals to steering sensor/actuator 250 to adjust a steering mechanism (e.g., a rudder) and substantially conform a heading of vehicle 101 to the desired heading and/or vehicle velocity.

In other embodiments, controller 130 may be adapted to monitor one or more other modules 260 (e.g., such as a radar module), as well as the sensor-motion compensated relative wind velocity and/or a vehicle velocity, and adjust a heading of vehicle 101 to safely evade collision with an object and/or other vehicles while staying below a maximum allowable heel angle, for example. In further embodiments, controller 130 may be adapted to transmit control signals to user interface 114 to display one or more alerts indicating an impending change in heading, an imminent collision, an estimated time of arrival to a way point, and other piloting alerts and/or sensor information.

In block 434, controller 130 determines an absolute wind velocity from the transformed sensor-motion compensated relative wind velocity processed in block 424 and the absolute vehicle velocity determined in block 430. For example, a logic device of controller 130 (e.g., or any other device of system 100 or 200) may be adapted to determine an absolute wind velocity by combining the absolute vehicle velocity with the transformed sensor-motion compensated relative wind velocity. In some embodiments, block 434 may be implemented with various filters and/or other signal processing operations to smooth, convert, transform, and/or otherwise prepare the absolute wind velocity for display and/or further processing.

In block 436, user interface 114 displays the absolute wind velocity determined in block 434. For example, a logic device of controller 130 (e.g., or any other device of system 100 or 200) may be adapted to transmit the absolute wind velocity processed in block 424 to user interface 114, and a logic device of user interface 114 may be adapted to receive the absolute wind velocity and use a display of user interface 114 to display it to a user in proximity to user interface 114. Display of the absolute wind velocity may be in accordance with one or more user inputs provided to user input 114, for example, such as a particular units convention, or referenced to a particular orientation of user interface 114. In some embodiments, block 436 may be optional depending on user input.

Figure 5:
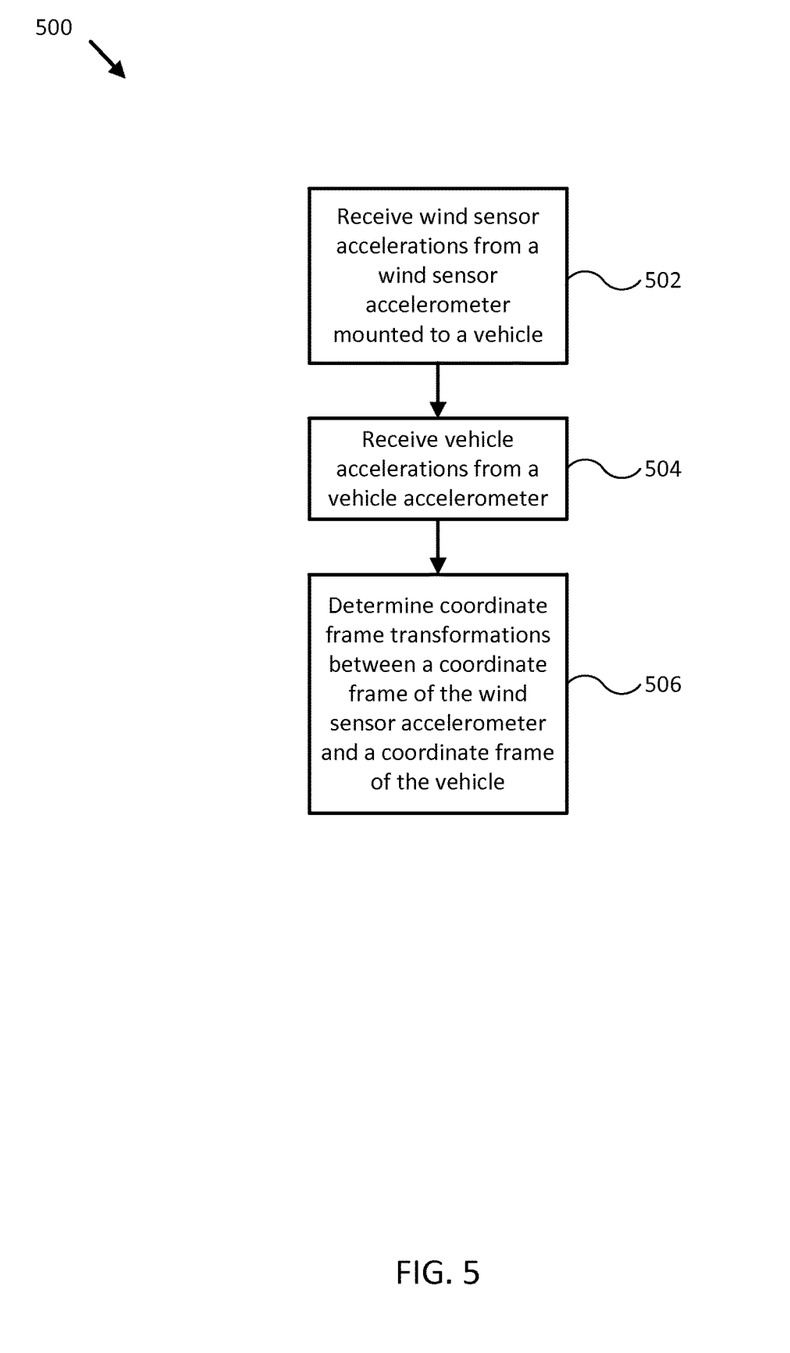
FIG. 5 illustrates a flow diagram of various operations to provide wind sensor motion compensation in accordance with an embodiment of the disclosure.

FIG. 5 illustrates a flow diagram of process 500 to provide wind sensor motion compensation for wind sensor 110 of vehicle 101 in accordance with an embodiment of the disclosure. In some embodiments, the operations of FIG. 5 may be implemented as software instructions executed by one or more logic devices associated with corresponding electronic devices and/or sensors of systems 100 and/or 200. More generally, the operations of FIG. 5 may be implemented with any combination of software instructions and/or electronic hardware (e.g., inductors, capacitors, amplifiers, or other analog and/or digital components).

Any step, sub-step, sub-process, or block of process 500 may be performed in an order or arrangement different from the embodiment illustrated by FIG. 5. Furthermore, block inputs, block outputs, various sensor signals, sensor information, and/or other operational parameters may be stored to one or more memories of systems 100 and/or 200 prior to moving to a following portion of process 500.

In some embodiments, process 500 may be performed by systems different from systems 100 and 200 and including a different selection of electronic devices, sensors, vehicles, and/or vehicle attributes. For example, process 500 may be performed by a system where vehicle 101 is an assembly and a mechanism adapted to introduce motion in the assembly (e.g., a shake table) and in a wind sensor accelerometer mounted to the assembly, so as to simulate vehicle accelerations and provide for calibration and/or accurate alignment of a coordinate frame of wind sensor accelerometer 111 with a coordinate frame of wind sensor 110 when mounting and/or otherwise integrating wind sensor accelerometer 111 with wind sensor 110.

In block 502, wind sensor 110 receives one or more wind sensor accelerations from wind sensor accelerometer 111 mounted to vehicle 101. For example, a logic device of wind sensor 110 (or any other device of system 100 or 200, such as user interface 114 and/or controller 130) may be adapted to receive wind sensor accelerations as one or more sensor signals transmitted by a logic device of wind sensor accelerometer 111. In some embodiments, wind sensor 110 may be adapted to store the wind sensor accelerations to a memory of wind sensor 110, for example, and/or to one or more memories of a device of system 100 or 200.

In embodiments where wind sensor accelerometer 111 is located on or within a housing of, is integrated with, and/or shares electrical components with, wind sensor 110, a logic device of wind sensor 110 may receive the wind sensor accelerations directly from an accelerometer of wind sensor accelerometer 111. Moreover, in some embodiments, wind sensor accelerometer 111 may be fixed relative to wind sensor 110, and a coordinate frame transformation between their respective coordinate frames may also be fixed.

In block 504, wind sensor 110 receives one or more vehicle accelerations from gyroscope/accelerometer 242. For example, a logic device of wind sensor 110 (or any other device of system 100 or 200, such as user interface 114 and/or controller 130) may be adapted to receive linear and/or angular accelerations as one or more sensor signals transmitted by a logic device of gyroscope/accelerometer 242, for example. In other embodiments, such vehicle accelerations may be transmitted as sensor information from one or more other devices of system 100 or 200. In some embodiments, wind sensor 110 may be adapted to store the vehicle accelerations to a memory of wind sensor 110 and/or to one or more memories of a device of system 100 or 200.

In block 506, wind sensor 110 determines one or more coordinate frame transformations between a coordinate frame of wind sensor accelerometer 111 and a coordinate frame of vehicle 101. For example, a logic device of wind sensor 110 (or any other device of system 100 or 200, such as user interface 114 and/or controller 130) may be adapted to determine coordinate frame transformations between wind sensor accelerations measured by wind sensor accelerometer 111 and a coordinate frame of vehicle 101, where the coordinate frame transformations are based on a comparison of the wind sensor accelerations received in block 502 to the vehicle accelerations received in block 504.

In one embodiment, parameters for the coordinate frame transforms may be determined by detecting relative orientations of coincident accelerations measured by both wind sensor accelerometer 111, and gyroscope/accelerometer 242. For example, the relative orientations may be substantially dependent on directions of coincident accelerations and not magnitudes of coincident accelerations, and so parameters determined from detecting such relative orientations may be largely free from errors due to sensor drift, as described herein. Detection of coincident accelerations may be based on peak detection and/or other signal processing, pattern detection, and/or coincident signal detection techniques, for example, and, in some embodiments, may be performed without requiring real time and/or synchronized measurements, which may substantially eliminate and/or obviate errors due to measurement timing mismatch.

In a further embodiment, a coordinate frame of wind sensor 110 may be aligned with a coordinate frame of vehicle 101, using any of the methods, processes, and/or devices described herein. For example, an orientation of wind sensor 110 may be physically aligned with a coordinate frame of vehicle 101, and/or parameters for a coordinate frame transformation between their respective coordinate frames may be determined and/or stored for repeated use, as described herein. In such embodiments, at least one of the coordinate frame transformations determined in block 506 will be operable to transform wind velocities measured by wind sensor 110 to a coordinate frame of wind sensor accelerometer 111. In general, the coordinate frame transformations determined in block 506 will be operable to transform measurements of either wind sensor 110 or wind sensor accelerometer 111 to a coordinate frame of the other. Similar methodologies may be used to calibrate any of the directional sensor devices of system 100 and/or 200.

Because processes 300, 400, and/or 500 provide and/or utilize a highly accurate wind sensor motion compensation system, embodiments of processes 300, 400, and/or 500 may be implemented to provide sensor-motion compensated relative wind velocities and/or absolute wind velocities reliable enough to form the basis for a safe and accurate piloting control system, as described herein. Furthermore, where physical access to at least a portion of the wind sensor motion compensation system is restricted and/or limited, due to positioning of a wind sensor relative to a vehicle, for example, the reduced operational power usage evidenced in embodiments of the present disclosure substantially increases the long-term utility and overall convenience of the system.

Where applicable, various embodiments provided by the present disclosure can be implemented using hardware, software, or combinations of hardware and software. Also where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a logic device configured to receive one or more sensor signals and determine a sensor-motion compensated relative wind velocity, wherein the logic device is adapted to:
receive a wind sensor acceleration and a relative wind velocity from a wind sensor mounted to a vehicle, wherein the wind sensor comprises a wind sensor accelerometer configured to measure an acceleration of the wind sensor and provide the measured acceleration of the wind sensor as the wind sensor acceleration;
determine a wind sensor velocity from the wind sensor acceleration; and
determine the sensor-motion compensated relative wind velocity based, at least in part, on a combination of the wind sensor velocity and the relative wind velocity.

2. The system of claim 1, further comprising the wind sensor and the wind sensor accelerometer, wherein the wind sensor accelerometer is located substantially near, on, or within a housing for the wind sensor.

3. The system of claim 1, wherein the determining the wind sensor velocity comprises:
removing one or more low frequency components of the wind sensor acceleration from the wind sensor acceleration;
integrating the wind sensor acceleration to determine the wind sensor velocity; and
removing one or more low frequency components of the wind sensor velocity from the wind sensor velocity.

4. The system of claim 3, wherein the removing one or more low frequency components of the wind sensor acceleration comprises high-pass filtering the wind sensor acceleration.

5. The system of claim 4, wherein the removing one or more low frequency components of the wind sensor velocity comprises high-pass filtering the wind sensor velocity using filter characteristics approximately the same as those used to high-pass filter the wind sensor acceleration.

6. The system of claim 1, wherein the logic device is adapted to transform the relative wind velocity to a coordinate frame of the wind sensor acceleration before determining the sensor-motion compensated relative wind velocity.

7. The system of claim 1, wherein the determining the sensor-motion compensated relative wind velocity comprises:
subtracting the wind sensor velocity from the relative wind velocity.

8. The system of claim 1, further comprising a user interface having a display, wherein the logic device is adapted to:
display, using the display of the user interface, a direction and/or magnitude of the sensor-motion compensated relative wind velocity to a user in proximity to the user interface.

9. The system of claim 1, further comprising:
a user interface having a display; and
one or more of a GPS, an orientation sensor, an accelerometer, or a water speed sensor mounted to the vehicle, wherein the logic device is adapted to:

determine a vehicle velocity based, at least in part, on sensor signals received from one or more of the GPS, the orientation sensor, the accelerometer, or the water speed sensor, determine an absolute wind velocity based, at least in part, on a combination of the vehicle velocity with the sensor-motion compensated relative wind velocity, and display, using the display of the user interface, a direction and/or magnitude of the absolute wind velocity to a user in proximity to the user interface.

10. The system of claim 9, wherein the logic device is adapted to transform the sensor-motion compensated relative wind velocity to a coordinate frame of the vehicle velocity before determining the absolute wind velocity.

11. The system of claim 1, further comprising a steering actuator configured to receive one or more control signals from the logic device, wherein the logic device is adapted to:

determine a vehicle velocity based, at least in part, on sensor signals received from one or more of a GPS, an orientation sensor, an accelerometer, or a water speed sensor mounted to the vehicle; and provide a control signal to the steering actuator corresponding to a desired vehicle velocity, wherein the desired vehicle velocity is based, at least in part, on the sensor-motion compensated relative wind velocity and the vehicle velocity.

12. A method comprising:

receiving a wind sensor acceleration and a relative wind velocity from a wind sensor mounted to a vehicle, wherein the wind sensor comprises a wind sensor accelerometer configured to measure an acceleration of the wind sensor and provide the measured acceleration of the wind sensor as the wind sensor acceleration;

determining a wind sensor velocity from the wind sensor acceleration; and determining a sensor-motion compensated relative wind velocity based, at least in part, on a combination of the wind sensor velocity and the relative wind velocity.

13. The method of claim 12, wherein:

the wind sensor accelerometer is located substantially near, on, or within a housing for the wind sensor.

14. The method of claim 12, wherein the determining the wind sensor velocity comprises:

removing one or more low frequency components of the wind sensor acceleration from the wind sensor acceleration;

integrating the wind sensor acceleration to determine the wind sensor velocity; and removing one or more low frequency components of the wind sensor velocity from the wind sensor velocity.

15. The method of claim 14, wherein the removing one or more low frequency components of the wind sensor acceleration comprises high-pass filtering the wind sensor acceleration.

16. The method of claim 15, wherein the removing one or more low frequency components of the wind sensor velocity comprises high-pass filtering the wind sensor velocity using filter characteristics approximately the same as those used to high-pass filter the wind sensor acceleration.

17. The method of claim 12, further comprising transforming the relative wind velocity to a coordinate frame of the wind sensor acceleration before determining the sensor-motion compensated relative wind velocity.

18. The method of claim 12, wherein the determining the sensor-motion compensated relative wind velocity comprises:

subtracting the wind sensor velocity from the relative wind velocity.

19. The method of claim 12, further comprising:

displaying, using a user interface, a direction and/or magnitude of the sensor-motion compensated relative wind velocity to a user.

20. The method of claim 12, further comprising:

determining a vehicle velocity;

determining an absolute wind velocity based, at least in part, on a combination of the vehicle velocity with the sensor-motion compensated relative wind velocity; and displaying, using a user interface, a direction and/or magnitude of the absolute wind velocity to a user.

21. The method of claim 20, further comprising transforming the sensor-motion compensated relative wind velocity to a coordinate frame of the vehicle velocity before determining the absolute wind velocity.

22. The method of claim 12, further comprising:

determining a vehicle velocity based, at least in part, on sensor signals received from one or more of a GPS, an orientation sensor, an accelerometer, or a water speed sensor mounted to the vehicle; and providing a control signal to a steering actuator corresponding to a desired vehicle velocity, wherein the desired vehicle velocity is based, at least in part, on the sensor-motion compensated relative wind velocity and the vehicle velocity.

23. The method of claim 12, wherein the receiving the wind sensor acceleration comprises:

receiving one or more wind sensor accelerations from the wind sensor accelerometer, wherein the wind sensor accelerometer is located substantially on or within a housing for the wind sensor, the method further comprising:

receiving one or more vehicle accelerations from a vehicle accelerometer; and determining one or more coordinate frame transformations between a coordinate frame of the wind sensor accelerometer and a coordinate frame of the vehicle, wherein the one or more coordinate frame transformations are based, at least in part, on a comparison of the one or more wind sensor accelerations to the one or more vehicle accelerations.

24. The method of claim 23, wherein:

a coordinate frame of the wind sensor is aligned with the coordinate frame of the vehicle; and at least one of the coordinate frame transformations is operable to transform a wind velocity measured by the wind sensor to the coordinate frame of the wind sensor accelerometer.

* * * * *